United States Patent
Tarighat Mehrabani et al.

(10) Patent No.: US 9,350,444 B2
(45) Date of Patent: *May 24, 2016

(54) WIRELESS COMMUNICATION DEVICE WITH SWITCHED POLARIZATION AND METHODS FOR USE THEREWITH

(71) Applicant: BROADCOM CORPORATION, Irvine, CA (US)

(72) Inventors: Alireza Tarighat Mehrabani, Irvine, CA (US); Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 14/011,074

(22) Filed: Aug. 27, 2013

(65) Prior Publication Data

US 2015/0057007 A1    Feb. 26, 2015

Related U.S. Application Data

(60) Provisional application No. 61/868,844, filed on Aug. 22, 2013.

(51) Int. Cl.
*H04W 72/00* (2009.01)
*H04B 7/26* (2006.01)
*H04B 7/10* (2006.01)

(52) U.S. Cl.
CPC ............... *H04B 7/2656* (2013.01); *H04B 7/10* (2013.01)

(58) Field of Classification Search
CPC ...................................... H04W 24/00
USPC ........................... 455/452.1, 552.1
See application file for complete search history.

(56) References Cited

U.S. PATENT DOCUMENTS

| | | | | |
|---|---|---|---|---|
| 8,331,946 | B2* | 12/2012 | Anreddy et al. | 455/450 |
| 8,830,886 | B2* | 9/2014 | Ekbatani et al. | 370/310 |
| 2009/0225885 | A1* | 9/2009 | Aoki et al. | 375/260 |
| 2009/0227260 | A1* | 9/2009 | Anreddy et al. | 455/450 |
| 2010/0130264 | A1* | 5/2010 | Yong et al. | 455/572 |
| 2010/0261440 | A1* | 10/2010 | Corman et al. | 455/91 |
| 2012/0064825 | A1* | 3/2012 | Landon et al. | 455/39 |
| 2012/0213111 | A1* | 8/2012 | Shimezawa et al. | 370/252 |
| 2014/0056167 | A1* | 2/2014 | Yuan et al. | 370/252 |

* cited by examiner

*Primary Examiner* — Justin Lee
(74) *Attorney, Agent, or Firm* — Garlick & Markison; Bruce E. Stuckman

(57) ABSTRACT

A wireless communication device includes a polarity setting module configured to set a plurality of polarity modes for the wireless communication with the plurality of external devices. The plurality of polarity modes includes selected ones of at least: a first polarity mode, and a second polarity mode. The polarity setting module sets the plurality of polarity modes based on information received from the plurality of external devices. A framing module is configured to generate data for transmission to the plurality of external devices based on the plurality of polarity modes set by the polarity setting module.

20 Claims, 7 Drawing Sheets

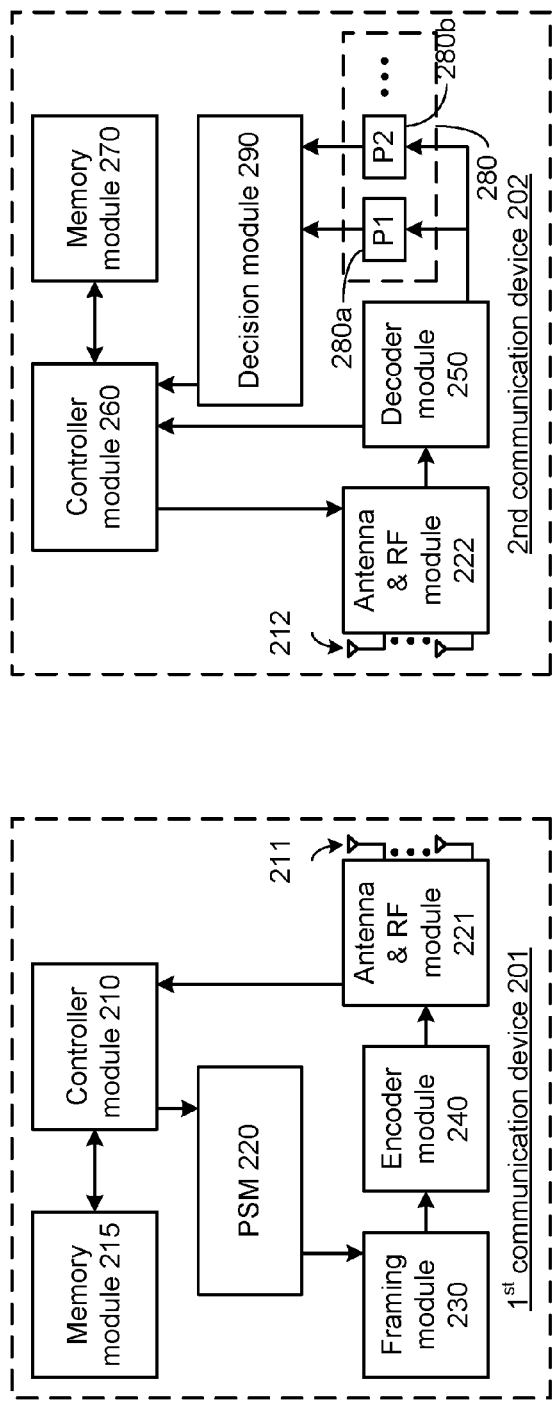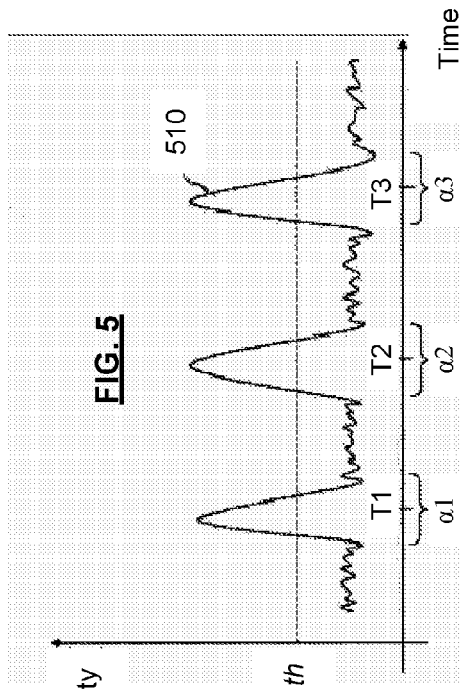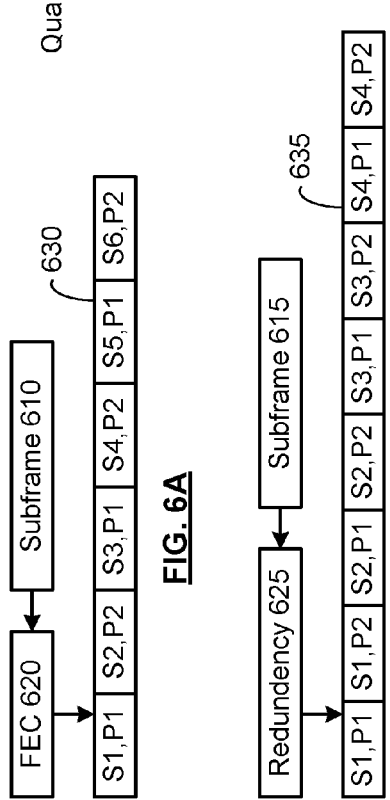

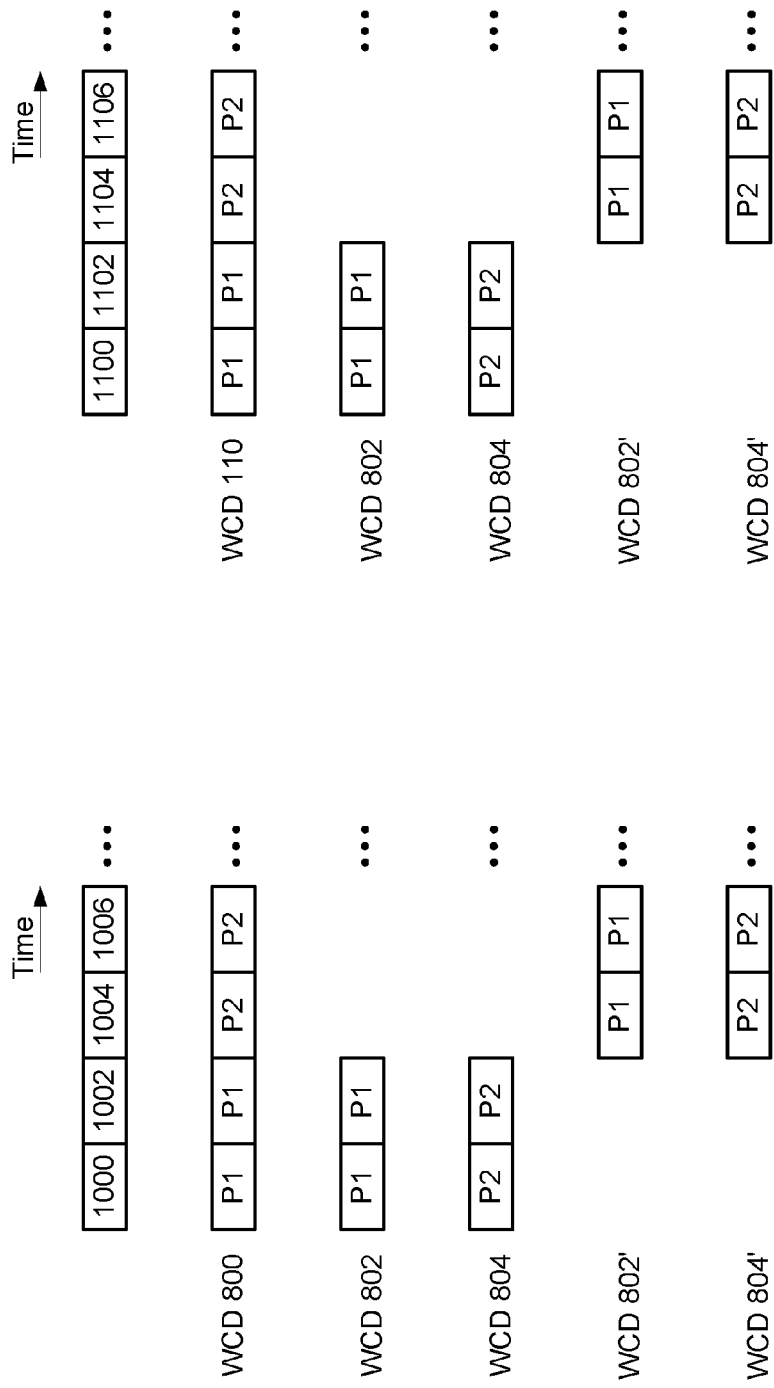

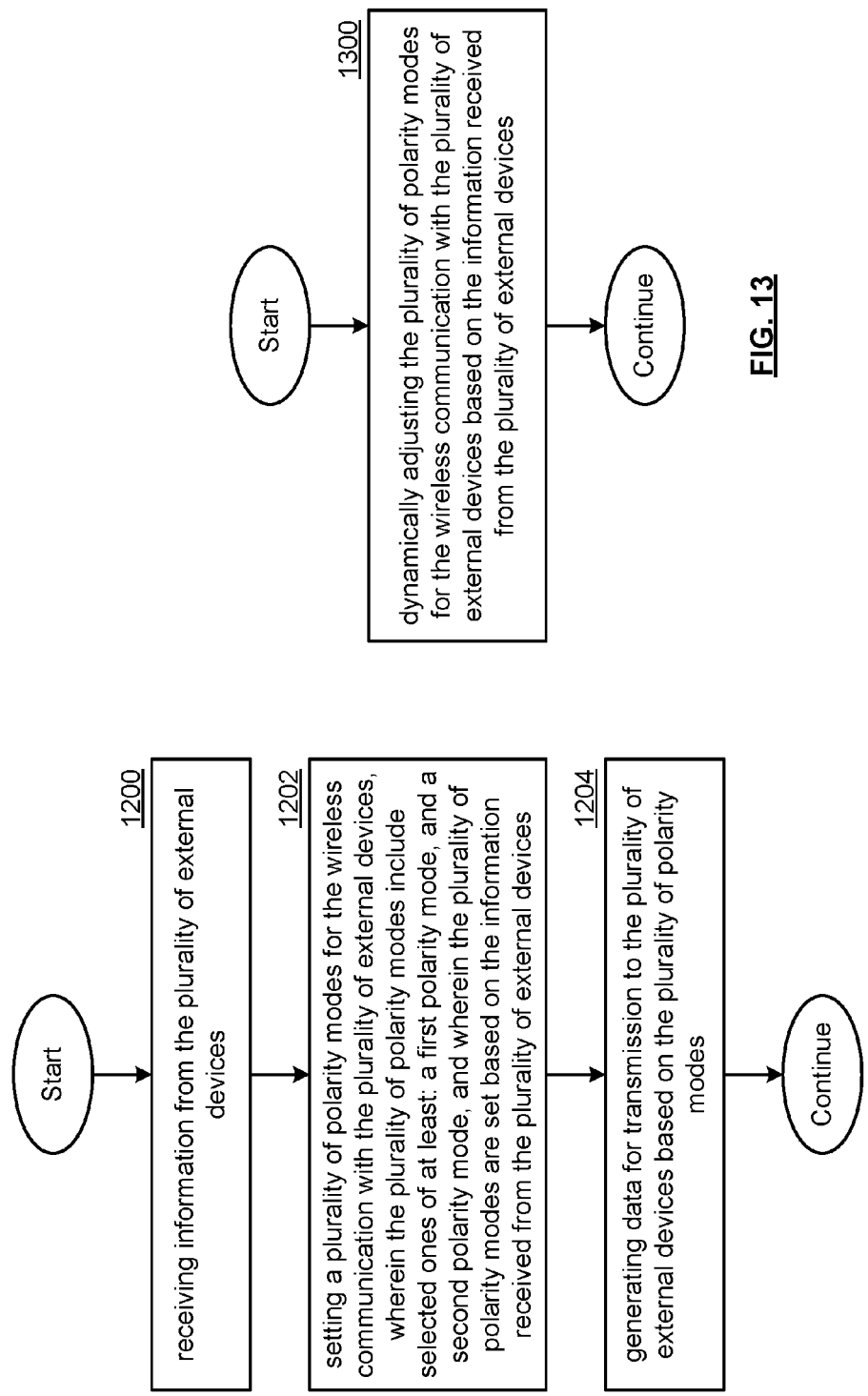

WIRELESS COMMUNICATION DEVICE WITH SWITCHED POLARIZATION AND METHODS FOR USE THEREWITH

CROSS REFERENCE TO RELATED PATENTS

The present application claims priority based on 35 USC 119 to the provisionally filed application entitled, WIRELESS COMMUNICATION DEVICE WITH SWITCHED POLARIZATION AND METHODS FOR USE THEREWITH, having Ser. No. 61/868,844, filed on Aug. 22, 2013, the contents of which are incorporated herein for any and all purposes, by reference thereto.

BACKGROUND

1. Technical Field

Various embodiments relate generally to wireless communication and more particularly to communication devices with transceivers and antenna systems that support wireless communications via different transmission polarizations.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, BLUETOOTH, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

During communication between wireless communication devices, signals sent from the first wireless communication device to the second will be transmitted with some original polarity. However, during transmission through the communication channel, that signal will likely reflect on one or more surfaces, with each reflection changing the polarity of the signal. Therefore, the second wireless communication device often does not receive the signal with the same polarity in which that signal was transmitted. In addition, the communication channel has a different channel response for different polarities.

BRIEF DESCRIPTION OF THE SEVERAL VIEWS OF THE DRAWING(S)

FIG. 2 illustrates a block diagram of an exemplary first wireless communication device and an exemplary second wireless communication device that are implemented as part of the wireless communication environment;

FIG. 5 illustrates an exemplary signal quality measurement determined by the second wireless communication device;

FIG. 6A illustrates an exemplary encoding and transmission technique of a data sub-frame;

FIG. 6B illustrates an exemplary encoding and transmission technique of a data sub-frame;

FIG. 10 illustrates a temporal diagram of wireless communications between an exemplary first wireless communication device and a plurality of exemplary second wireless communication devices as part of the wireless communication environment;

FIG. 11 illustrates a temporal diagram of wireless communications between an exemplary first wireless communication device and a plurality of exemplary second wireless communication devices as part of the wireless communication environment;

FIG. 12 illustrates a flow diagram of a method used in conjunction the wireless communication environment; and FIG. 13 illustrates a flow diagram of a method used in conjunction the wireless communication environment.

DETAILED DESCRIPTION

Figure 1A:
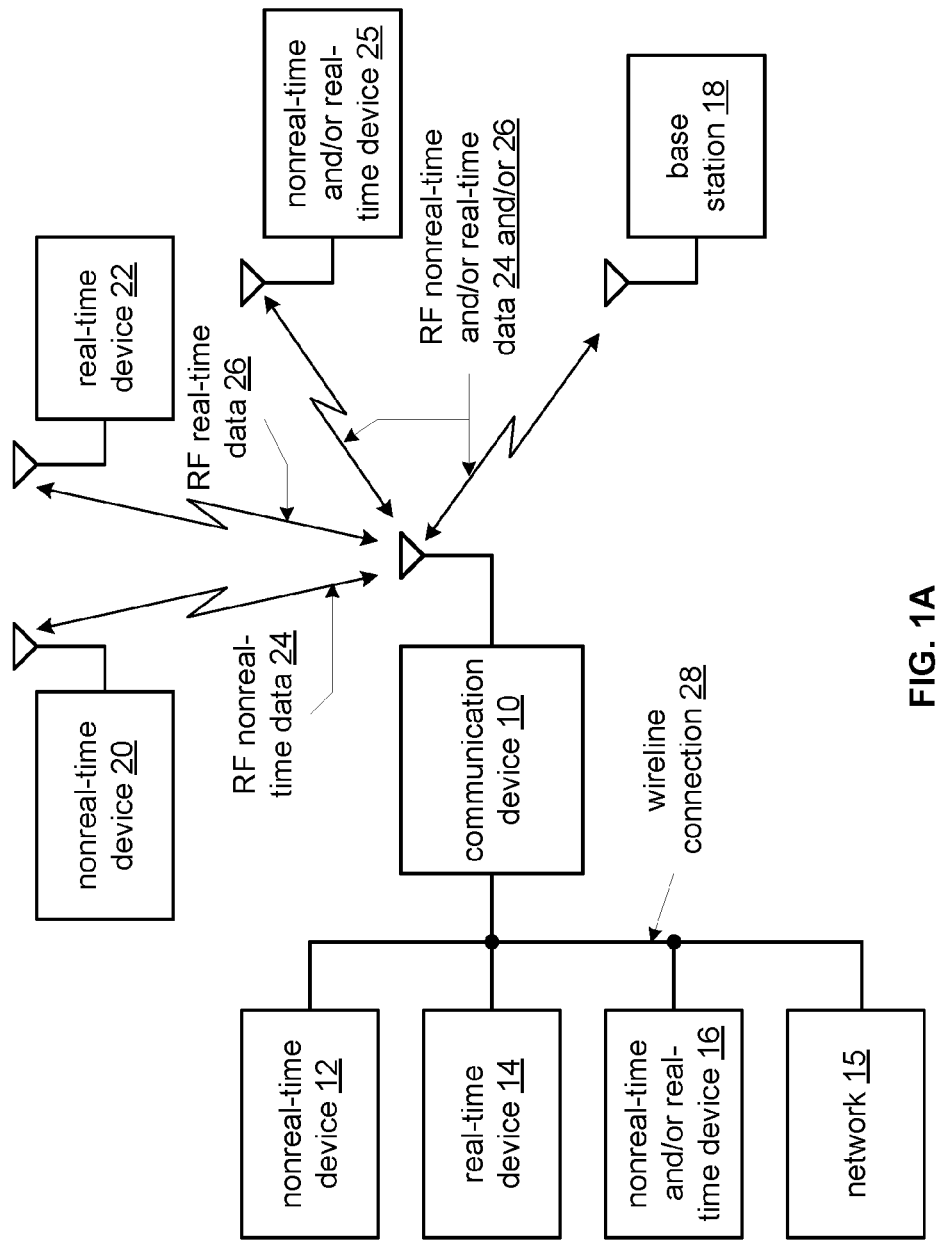
FIG. 1A illustrates a block diagram of an exemplary wireless communication environment.

FIG. 1a illustrates a block diagram of an exemplary wireless communication environment. In particular a communication system is shown that includes a communication device 10 that communicates real-time data 24 and/or non-real-time data 26 wirelessly with one or more other devices such as base station 18, non-real-time device 20, real-time device 22, and non-real-time and/or real-time device 25. In addition, communication device 10 can also optionally communicate over a wireline connection with network 15, non-real-time device 12, real-time device 14, non-real-time and/or real-time device 16.

In an embodiment the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as WiHD, WiGig, NGMS, IEEE 802.11a, ac, ad, b, g, n, or other 802.11 standard protocol, BLUETOOTH, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Long term Evolution (LTE), Personal Communication Services (PCS), or other mobile wireless protocol or other wireless communication protocol, either standard or proprietary. Further, the wireless communication path can include multiple transmit and receive antennas, as well as separate transmit and receive paths to and from the communication device 10. RF communications can utilize different frequency spectra such as an 800 MHz, 900 MHz, 2.4 GHz, 5

GHz, 60 GHz or other millimeter wave or V band frequencies, or other licensed or unlicensed spectra.

Communication device 10 can be a mobile phone such as a cellular telephone, a local area network device, personal area network device or other wireless network device, a personal digital assistant, tablet, game console, personal computer, laptop computer, or other device that performs one or more functions that include communication of voice and/or data via the wireless communication path. Further communication device 10 can be an access point, base station or other network access device that is coupled to a network 15 such at the Internet or other wide area network, either public or private, via wireline connection 28. In an embodiment, the real-time and non-real-time devices 12, 14, 16, 20, 22 and 25 can be personal computers, laptops, PDAs, mobile phones, such as cellular telephones, devices equipped with wireless local area network or BLUETOOTH transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment, the communication device 10 includes a wireless transceiver that operates in conjunction with an antenna array to produce transmissions at different transmission polarizations and that includes one or more features or functions of the various embodiments that are described in greater detail in association with FIGS. 1B and 2-13 that follow.

Figure 1B:
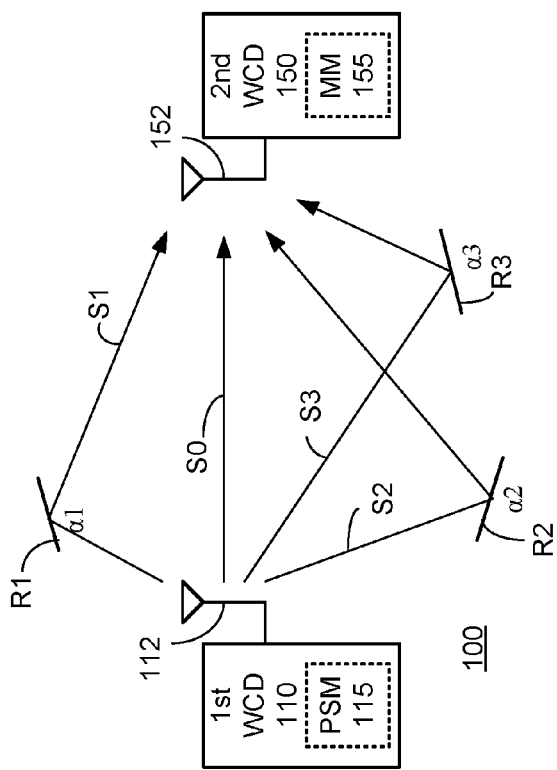
FIG. 1B illustrates a block diagram of an exemplary wireless communication environment.

FIG. 1B illustrates a block diagram of a wireless communication environment 100 according to an exemplary embodiment. The wireless communication environment 100 provides wireless communication of information, such as one or more commands and/or data, between wireless communication devices (WCDs). The wireless communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the various embodiments.

The exemplary wireless communication environment 100 includes a first wireless communication device 110 and a second wireless communication device 150. The first wireless communication device 110 may represent an exemplary embodiment of a base station or access point or other communication device 10, and the second wireless communication device 150 may represent an exemplary embodiment of user equipment within a cellular communications network, a wireless local area network or other wireless communication environment such as real-time and non-real-time devices 12, 14, 16, 20, 22 and 25.

The first wireless communication device 110 includes a polarity setting module 115 for setting a polarity of transmitted signals, and includes an antenna 112 for transmitting the signals into the wireless communication environment 100. Herein, "polarity" refers the electric field polarity of transmitted wireless signal as it is radiated from the transmitting antenna, and may, for example, include a horizontal polarity, vertical polarity, right-hand circular polarity, lefthand circular polarity or other polarity. The second wireless communication device 150 includes an antenna 152 for receiving the signals from the wireless communication environment 100, and includes a measurement module 155 for measuring channel conditions with respect to different polarities. Those skilled in the relevant art(s) will recognize that each of the antenna 112 and the antenna 152 may include one or more antennas, and may be capable of both transmitting and receiving signals.

The wireless communication environment 100 may also include a plurality of reflection surfaces R1, R2 and R3 which reflect the transmitted signals on their paths from the first wireless communication device 100 to the second wireless communication device 150. For example, a signal S0 is transmitted directly from the first wireless communication device 110 to the second wireless communication device 150 without any intervening reflections; signal S1, transmitted at a transmission angle $\alpha 1$, is reflected by reflection surface R1; signal S2, transmitted at a transmission angle $\alpha 2$, is reflected by reflection surface R2; and signal S3, transmitted at a transmission angle $\alpha 3$, is reflected by reflection surface R3.

Detailed functionality of the first wireless communication device 110 and the second wireless communication device 150, as well as the effects of the reflection surfaces R1-R3, including several optional functions and features are discussed below.

FIG. 2 illustrates a block diagram of an exemplary first wireless communication device 201 and an exemplary second wireless communication device 202 that may be implemented as part of the wireless communication environment 100. The first wireless communication device 201 provides an example of first wireless communication device 110 and may represent an exemplary embodiment of a base station or access point or other communication device 10. The second wireless communication device 202 provides an example of second wireless communication device 150 and may represent an exemplary embodiment of user equipment within a cellular communications network, a wireless local area network or other wireless communication environment such as real-time and non-real-time devices 12, 14, 16, 20, 22 and 25. While the first communication device 201 and the second communication device 202 are shown as including various modules to illustrate one or more features of various embodiments, additional modules and components can likewise be included to support the additional functions of first wireless communication device 110, second wireless communication device 150, real-time and non-real-time devices 12, 14, 16, 20, 22 and 25, etc.

The first wireless communication device 201 includes a polarity setting module (PSM) 220 and a framing module 230, and may represent an exemplary embodiment of the first wireless communication device 110. The second wireless communication device 202 includes a measurement module 280 and a decision module 290, and may represent an exemplary embodiment of the second wireless communication device 150.

For purposes of this discussion, the first wireless communication device 201 will be described with respect to preparing and transmitting signals. Therefore, only the functionality of the first wireless communication device 201 relating to preparing and transmitting signals will be discussed. However, it will be understood that the first wireless communication device 201 may also receive signals, in either a conventional manner, or with further reception polarization control as described below with respect to the second wireless communication device 202.

The first wireless communication device 201 includes an antenna and RF module 221 for sending signals to, and receiving signals from, the wireless communication environment 100 via an antenna array 211 which may include one or more antennas. The first wireless communication device 201 also includes a controller module 210 for performing general background control, as well as for processing signals received from the antenna and RF module 221, and a memory module 215 capable of storing various digital information. While shown schematically as separate modules, controller module 210, polarity setting module 220, framing module 230 and encoder module 240 can be implemented by a single processing device or a plurality of processing devices.

The first wireless communication device 201 also includes a polarity setting module 220, such as polarity setting module 115, for setting a polarity of outgoing signals based on information received from the controller module 210. The polarity setting module 220 communicates with a framing module 230, which prepares data sub-frames for transmission based in part of the polarity setting module 220. Once the data sub-frames have been prepared, an encoder module 240 encodes the data sub-frames and forwards the encoded sub-frames to the antenna and RF module 221 for transmission to the plurality of external devices via RF signaling in accordance with the selected polarity mode or modes. It will be noted that the antenna and RF module 221 may include the necessary transmitter and receiver RF front-end functionality to effect wireless communications (e.g. amplifiers, mixers, filters, local oscillators, etc.) in attention to the antenna array 211, as will be understood by those skilled in the arts. Further, while the polarity setting module 220 is shown as controlling the input to the framing module 230, the polarity setting module may further be coupled to the antenna module 221 to set and/or adjust the particular polarity mode of the first wireless communication device 201. In this fashion, transmission polarity can be adjusted based on either baseband processing, RF processing or antenna selection.

As discussed above, the first wireless communication device 201 and the second wireless communication device 202 should preferably select a polarization orientation for communication that has the best channel response, but the channel response likely differs for each polarization option. Therefore, when preparing sub-frames for communication, the framing module 230 prepares them in such a way as to allow for channel measurements of both polarities by a receiver.

The second communication device 202 includes an antenna and RF module 222, a decoder module 240, a measurement module 280, a decision module 290, a controller module 260 and a memory module 270. While shown schematically as separate modules, controller module 260, decoder module 240, a measurement module 280, and a decision module 290 can be implemented by a single processing device or a plurality of processing devices. Further functions and features of wireless communication device 202 are described in conjunction with FIGS. 3-13 that follow.

Figure 3:
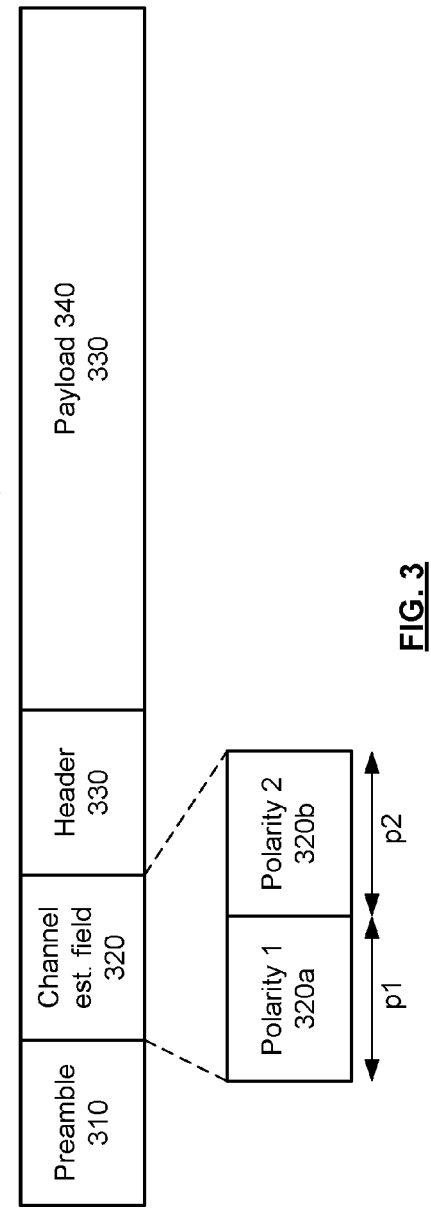
FIG. 3 illustrates an exemplary data sub-frame generated by the first wireless communication device.

FIG. 3 illustrates an exemplary data sub-frame 300 generated by the first wireless communication device 201. Like most data sub-frames, the sub-frame 300 includes a preamble portion 310, a channel estimation field portion 320, a header portion 330, and a payload portion 340. Conventionally, the channel estimation field 320 includes preset information or tones. This allows a receiver to measure the channel response by analyzing the received channel estimation field and determining the effect that the channel had on that known information. However, conventional channel estimation fields are transmitted in a single polarity, which allows for the receiver only to measure the channel with respect to that single polarity.

In order to allow the receiver to measure multiple polarities, the channel estimation field 320 of the sub-frame 300 is split into a first polarity portion 320a and a second polarity portion 320b. The first polarity portion 320a is set to a first polarity (e.g., vertical or right-hand circular) and the second polarity portion is set to a second polarity that is orthogonal to the first polarity (e.g., horizontal or left-hand circular).

In this manner, the sub-frame 300 is transmitted by the first wireless communication device 201 with a channel estimation field 320 that includes at least two polarities such as two orthogonal polarities. While shown in terms of two polarities a larger number can be employed. Consequently, the sub-frame that is ultimately received by the second wireless communication device 202 will also include a channel estimation field 320 that includes multiple polarities. Specifically, because of the orthogonality of the polarities within the channel estimation field 320, regardless of reflections that occur during communication, the first polarity portion 320a and the second polarity portion 320b will not interfere with one another. Consequently, the second wireless communication device 202 will be able to measure channel response for each of these multiple polarities simultaneously or contemporaneously, as discussed in further detail below.

In addition, depending on one or more parameters, the framing module 230 may dynamically generate the channel estimation field 320 so that its first polarity portion 320a and second polarity portion 320b are different in size in order to improve or optimize measurements. For example, the framing module 230 may reduce the size of one of the polarity portions in order to allow for an expansion in the size of the other polarity portion. This may be desired based on which polarity is currently being used for communication, signal quality of received signals, and/or channel conditions, among other parameters within the spirit and scope of the present disclosure. Signal quality may be measured, for example, as signal-to-noise ratio (SNR), signal to interference-plus-noise ratio (SINR), received signal strength indicator (RSSI), bit error rate (BER), etc.

For example, if the first wireless communication device 201 is currently transmitting signals using a first polarity, the framing module 230 may increase the size of the second polarity portion 320b so as to provide more information to be used for measuring the second polarity channel response. In this manner, the framing module 230 can improve or optimize the sizes of the polarity portions of the channel estimation field 320, provided that the size of the first polarity portion $p_1$ plus the size of the second polarity portion $p_2$ is equal to the size of the channel estimation field 320.

For purposes of this discussion, the second wireless communication device 202 will be described with respect to receiving and analyzing signals from the first wireless communication device 201. Therefore, only the functionality of the first wireless communication device relating to these features will be discussed in detail. However, it will be understood that the second wireless communication device 202 may also transmit signals, in either a conventional manner, or as described above with respect to transmit polarity control of the first wireless communication device 201.

The second wireless communication device 202 includes an antenna and RF module 222 that receives signals from the wireless communication environment 100 via an antenna array 212, which may include one or more antennas. The antenna and RF module 222 forwards received signals to a decoder module 250, which decodes the received signals. The second wireless communication device 202 also includes a controller module 260, which performs general background control, as well as processes the decoded signals received from the decoder module 250, and a memory module 270 capable of storing various digital information. It will be noted that the antenna and RF module 222 may include the necessary transmitter and receiver RF front-end functionality to effect wireless communications (e.g. amplifiers, mixers, filters, local oscillators, etc.) in attention to the antenna array 212, as will be understood by those skilled in the arts.

In addition to forwarding the decoded signals to the controller module 260, the decoder module 250 also forwards the decoded signals to a measurement module 280. The measurement module 280 includes a first polarity measurement module 280a and a second polarity measurement module 280b and optionally additional polarity measurement modules in embodiments where more than two polarities are employed. The received signal is sent to each of the first polarity measurement module 280a and the second polarity measurement module 280b, each of which measures channel conditions from the received signal.

Presuming that the signal received by the second wireless communication device 202 has a format as shown in FIG. 3, then the first polarity measurement module 280a measures the channel response with respect to the first polarity based on the first polarity portion 320a of the channel estimation field 320. Similarly, the second polarity measurement module 280b measures the channel response with respect to the second polarity based on the second polarity portion 320b of the channel estimation field 320. As discussed above, the channel estimation sub-fields 320a, b include predetermined information, tones or other polarity measurement and training information. Therefore, measurements modules 280a, 280b measure the channel response by analyzing the respective received channel estimation sub field and determining the effect that the channel had on the known information. In this manner, the second wireless communication device 202 is able to simultaneously measure channel response for multiple different polarities using a single data sub-frame.

It should be noted that the measurement module 280 may determine the locations of the first polarity portion 320a and the second polarity portion 320b within the received data sub-frame from information included within the preamble portion 310 and/or the header portion 330 of the received data sub-frame 300. Alternatively, the measurement module 280 may conceivably include hardware, software, and/or firmware for determining the boundaries of the first polarity portion 320a and the second polarity portion 320b without any additional information.

Once the channel response has been measured with respect to each of the polarities, the measurement module 280 forwards the results to a decision module 290. The decision module 290 determines, based on the received channel response information, which polarity is preferred and/or whether to initiate a polarity switch in order to switch from a current communication polarity to an alternative polarity. The decision module 290 may make its determination based on any number of factors, including which polarity exhibits better channel response, the current communication polarity, and the difference between the channel response of the alternative polarity and the channel response of the current polarity, etc. After making its decision, the decision module 290 forwards the result to the controller module 260 for further processing, as discussed below.

During communication, there are many ways in which the first wireless communication device 201 and the second wireless communication device 202 can coordinate with each other so as to communicate using the most preferred signal polarity, among other signal characteristics.

As discussed above, it is important during communication for the second wireless communication device 202 to select a polarization for future signals transmitted by the first wireless communication device 201. Therefore, measurement module 280 measures the channel response with respect to the different polarizations included within the channel estimation field 320 of the received sub-frame 300. Once measured, the decision module 290 makes a determination, based on the measured channel responses, as to whether to initiate a switch from a current polarity to the alternative polarity.

If the decision module 290 determines that a switch should be initiated, for any of the reasons discussed previously, the decision module 290 reports this determination to the controller module 260. The controller module 260 then generates and forwards a polarity instruction signal to the antenna module for transmission to the first wireless communication device. It should be noted that a similar procedure may be performed in order to select an initial signal polarity.

Upon receipt of the polarity instruction signal by the first wireless communication device 201, the antenna and RF module 221 forwards the polarity instruction signal to the controller module 210. The controller module 210 processes the polarity instruction to determine how to set its polarity, and forwards the result to the polarity setting module 220. When preparing future data for transmission, the framing module 230 prepares data sub-frames with the polarity set in the polarity setting module 220. In this manner, the first wireless communication device 201 is able to accommodate the preferred polarity (e.g., the polarity that provides the better channel response) as measured by the second wireless communication device 202.

Figure 4:
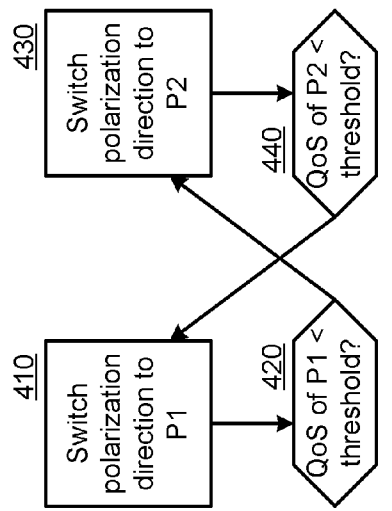
FIG. 4 illustrates a block diagram of an exemplary method for selecting a polarization direction of a transmitted signal.

FIG. 4 illustrates a block diagram of an exemplary method for selecting a polarization direction of a transmitted signal in accordance with the above description. Presuming that the second wireless communication device 202 is currently receiving signals having the first polarity, the device remains in this configuration until one or more conditions have been met (420). Example conditions may include whether Quality of Service (QoS) of the received signals falls below a predetermined threshold, whether the channel response of the alternative polarity is significantly better than the channel response of the current polarity, etc., to provide some examples.

Once the conditions have been met, the second wireless communication device 202 initiates the polarization switch to a second polarization (430). At this time, the first wireless communication device 201 begins transmitting signals having the second polarization, and the second wireless communication device 202 begins monitoring the received signals having the second polarization (440). The devices remain in this configuration until a second set of conditions (which may be the same or different from those discussed above regarding the first polarity) have been met. When the conditions have been met, the device again initiates a switch back to the first polarity (410).

In this manner, the wireless communication devices can continue to communicate using an optimal signal polarization. Consequently, negative effects of the channel can be reduced, and signal quality can be improved.

Another parameter that may be controlled is transmission angle of transmitted signals. Those skilled in the relevant art(s) will recognize that beam-forming and other directivity techniques allow wireless transmitters to direct wirelessly-transmitted signals in a particular physical direction, so that mainbeam and/or sidelobes of the radiated signal can be steered in space.

As discussed above, and as shown in FIG. 1B, the first wireless communication device 110 may transmit signals to the second wireless communication device 150 in any of multiple different directions, each of which will have its own channel response for each different polarity. Therefore, by comparing the responses of the different transmission angles, further improvement or optimization can be achieved for improving signal quality.

In order to select a preferred transmission angle, the wireless communication devices may coordinate the initiation of a transmission sweep. The sweep may consist of transmitting signals over a period of time in each of a plurality of different directions (preferably in some predetermined order). During this period, the second wireless communication device 150 measures characteristics of the received signals. These characteristics are preferably the channel response of the first polarity portion 320a and the second polarity portion 320b of the received sub-frames, but may additionally or alternatively include other measurements, such as QoS, for example.

FIG. 5 illustrates an exemplary signal quality measurement 510 determined by the second wireless communication device 150. As shown in FIG. 5, there are several periods of very poor signal quality, which correspond to particularly noisy communication paths, or paths that do not adequately reflect the signal to the second wireless communication device 150. Between those low-quality periods are bursts of high-quality periods, which correspond to low-noise paths and/or paths whose reflections direct the signal to the second wireless communication device 150.

From this signal quality measurement, the second wireless communication device 150 can determine the high-quality transmission angles by comparing the measured signal quality to a predetermined threshold th. As discussed above, signal quality may be measured, for example, as signal-to-noise ratio (SNR), signal to interference-plus-noise ratio (SINR), received signal strength indicator (RSSI), bit error rate (BER), etc. Times at which the received signal quality was above the threshold th (e.g., times T1, T2 and T3) are then reported to the first wireless communication device 110 along with the measured time having the best signal quality (e.g., time T3).

The first wireless communication device 110 matches the received time information with its transmission angles. For example, the first wireless communication device 110 determines that at time T1, it was transmitting at angle α1; at time T2, it was transmitting at angle α2; and at time T3, it was transmitting at angle α3. The transmitter then sets the transmission angle to angle α3 corresponding to the best signal quality identified by the second wireless communication device. In this manner, the devices are able to select an improved or optimized communication path in addition to selecting a preferred polarity.

In order to streamline coordination and switching between the first wireless communication device 201 and the second wireless communication device 202, it may be beneficial for each of those devices to maintain and update a table of information relating to each of the different possible link combinations.

As discussed above, each polarity and each transmission direction result in a different channel response, and therefore different communication qualities. Further, additional information may also be tracked (discussed below), which adds to the complexity of selecting new communication parameters. Therefore, the first and second wireless communication devices can maintain measured information in order to quickly and efficiently maintain communication optimization.

Table 1 below illustrates an exemplary table of information that may be shared between the first wireless communication device 201 and the second wireless communication device 202. As discussed above, each of the first wireless communication device 201 and the second wireless communication device 202 may measure various signals, data or gather other information during communication, which can then be shared with the other device so that each maintains a table of possible communication parameters.

TABLE 1

Example information stored for efficient switching

| POLARITY | ANGLE | QUALITY |
|---|---|---|
| Polarity 1 | Angle α1 | Q1 |
| Polarity 1 | Angle α2 | Q2 |
| Polarity 1 | Angle α3 | Q3 |
| Polarity 2 | Angle α1 | Q1 |
| Polarity 2 | Angle α2 | Q1 |
| Polarity 2 | Angle α3 | Q1 |

For example, the second wireless communication device 202 may be capable of measuring channel response for each polarity, whereas the first wireless communication device 201 may be capable of pairing signal qualities measured by the second wireless communication device 202 with transmission angles. When the first wireless communication device 201 generates measurement information that is pertinent to the communication, the controller module 210 stores that information in the memory module 215 for future reference. Similarly, for measurement information generated by the second wireless communication device 202, the controller module 260 causes the information to be stored in the memory module 270 for future reference.

This information may be stored in the form of a correspondence table, similar to Table 1, above. In other words, signal quality or channel response measurements may be stored in correspondence with the communication parameters associated with those measurements, such as polarity, transmission angle, etc. In addition, in order to maintain synchronization with each other, the first and second wireless communication devices may share their own measurement information with the other. Further, the information contained within the tables may be occasionally updated. This may be performed at specific intervals, or after certain conditions have been met, such as change in channel conditions, etc.

Utilizing these techniques, the wireless communication devices can share information with one another in order to streamline parameter switches. In an embodiment, wireless communication devices can synchronize their data tables with one another in order to streamline parameter switches. For example, during communication, the second wireless communication device 202 may determine that current communication parameters are producing unacceptable signal quality and/or channel response. Consequently, the second wireless communication device 202 initiates a switch from the current set of communication parameters to another set of parameters. Because the second wireless communication device 202 maintains a data table with the signal qualities of other sets of communication parameters, the second wireless communication device 202 can immediately select a new set of communication parameters simply by identifying the stored set of parameters having the best signal quality, or selecting a set of parameters whose signal quality exceeds a predetermined threshold.

In addition, in order to adapt the first wireless communication device 201 to the newly-selected communication parameters, the second wireless communication device 202 need only communicate that a switch has been initiated. Because the first wireless communication device 201 maintains the same table as the second wireless communication device 202, the first wireless communication device 201 can immediately adjust to the new parameters by selecting the set of parameters that are stored in correspondence with the best signal quality, or selecting a set of parameters whose signal quality exceeds a predetermined threshold. In other words, the table provides a pre-determined ranking of signal quality for the various combinations of polarizations and angle of transmission.

In this manner, the first and second wireless communication devices can quickly and efficiently switch communication parameters when circumstances warrant. Consequently, the devices can maintain communication optimization with very little transition time.

As discussed above, the first wireless communication device 201 and the second wireless communication device 202 include antenna arrays 211 and 212, respectively. When these antenna arrays include multiple antennas, communication can be further optimized by adjusting the parameters of each antenna within each array individually. Specifically, whereas the above discussions presumed that communication parameters (polarity, direction, etc.) are applied to all antennas, further improvement or optimization can be achieved by applying individual parameters to individual antennas, or subsets of antennas, in the antenna array.

For example, during the channel estimation, the second wireless communication device 202 may measure the channel response for each antenna of its array. The second wireless communication device can then set the polarities and/or other properties of each of its individual antennas based on the measurement results.

In addition, this antenna-based optimization can be coordinated with the first wireless communication device 201. For example, based on the measurements by the second wireless communication device 202, the first wireless communication device can set parameters for each of its antennas. Further, by coordinating a directionality scan between the devices, the first wireless communication device 201 can adjust each individual antenna, or small groups of antennas, to transmit signals in different directions depending on the measurement data determined by the second wireless communication device.

In order to aid this operation, it is again beneficial for the second wireless communication device 202 and the first wireless communication device 201 to share measurement information so that both can maintain a table of signal qualities based on various parameters. Of course, the addition of being able to adjust each individual antenna will add at least one additional layer of complexity to the tables. In other words, Table 1 (shown above) will exist for each individual antenna, or subsets of antennas, for example. In this manner, the devices can further increase optimization and detail in order to even further improve communication.

The above provides various static polarization configurations, which select a configuration and remain in that configuration until some future event. However, in certain circumstances, it may be preferably to communicate via a dynamic polarization configuration, in which the polarization repeatedly switches without the occurrence of any particular event. This may be particularly beneficial when there is no data table, when measurements are significantly close to each other, when measurement are unreliable, and/or when the channel is changing too fast to benefit from a static configuration, among others. In these circumstances, it may be beneficial to institute dynamic polarization.

In one example, a dynamic polarization configuration can be utilized in order to aid in error correction. FIGS. 6A and 6B illustrate exemplary encoding and transmission techniques that utilize polarity parameters. FIG. 6A specifically illustrates a forward error correcting (FEC) technique that utilizes signal polarization. As shown in FIG. 6A, an exemplary data sub-frame 610 may be 4 segments in length, with each segment containing the same number of bits. The sub-frame 610 passes through an FEC module 620, which encodes the original sub-frame with redundancy or parity to generate an encoded sub-frame 630. The number of redundancy/parity bits added to the signal depend on a coding rate employed by the FEC module 620, which may vary depending on one or more conditions. For example, the number of the redundancy/parity bits may increase as channel quality decreases.

As shown in FIG. 6A, the exemplary encoded sub-frame 630 includes 6 segments, each having the same number of bits as the segments of the original data sub-frame 610. During transmission, the first wireless communication device 201 transmits the segments with alternating polarity. For example, the first wireless communication device 201 transmits segment S1 with polarity P1; segment S2 with polarity P2; segment S3 with polarity P1; segment S4 with polarity P2; segment S5 with polarity P1; and segment S6 with polarity P2.

In this manner, the devices can utilize the benefits of diversity during communication. For example, segments utilizing the polarization P1 may be received by the second wireless communication device 202 with worse link quality than the segments utilizing polarization P2. During decoding, the second wireless communication device 202 can rely on the increased quality of the P2 segments for decoding the proper signal, despite the P1 segments being received at lower link quality.

FIG. 6B specifically illustrates a redundancy error correcting technique that utilizes signal polarizations. As shown in FIG. 6B, an exemplary data sub-frame 615 may be 4 segments in length, with each segment containing the same number of bits. The sub-frame passes through a redundancy module 625, which encodes the original sub-frame with redundancy to generate an encoded sub-frame 635. During the redundancy encoding, the redundancy module 625 essential repeats each of the 4 segments for each polarity.

Consequently, the resulting encoded sub-frame 635 includes 8 segments (equal to twice the number of original segments), each having the same number of bits as the segments of the original data sub-frame 615. During transmission, the first wireless communication device 201 transmits the segments with alternating polarity. For example, the first wireless communication device 201 transmits segment S1 with polarity P1; segment S1 again with polarity P2; segment S2 with polarity P1; segment S2 again with polarity P2;

segment S3 with polarity P1; segment S3 again with polarity P2; segment S4 with polarity P1; and segment S4 again with polarity P2.

In this manner, the devices again utilize the benefits of diversity during communication. For example, segments received by the second wireless communication device 202 can be recombined based on their respective signal qualities. Specifically, if the second wireless communication device 202 determines that the P1 segments have a lower signal quality than the P2 segments, the second wireless communication device 202 can decode the original signal, giving more weight to the P2 segments than the P1 segments.

Although this technique has been described with respect to single redundancy (transmitting each segment one additional time), similar principles can be applied to multiple redundancy (transmitting each segment more than one additional time). By weighing the accuracy of the received segments based on the quality of their corresponding polarizations, transmission bit errors can more easily and efficiently be identified and corrected.

As shown above, these exemplary configurations constitute dynamic polarization configurations because they transmit consecutive segments of information (from even a single data sub-frame) using different polarities. However, dynamic polarization configurations are not limited to these examples, and may also include configurations in which the polarization automatically switched for each data sub-frame, or after each group of sub-frames, and any combination thereof.

Similar to static polarization switching, the wireless communication devices must have some algorithm or method for determining when to remain in a static polarization configuration, and when it becomes necessary or desirable to switch to a dynamic polarization configuration.

Figure 7:
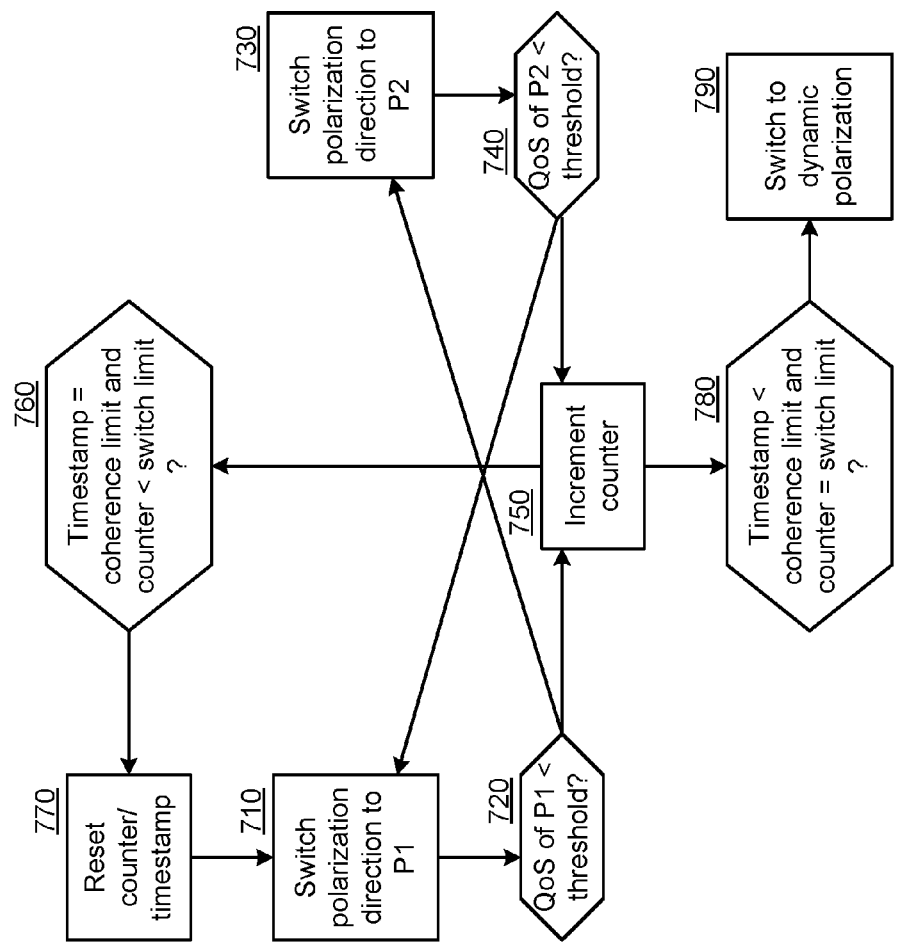
FIG. 7 illustrates a block diagram of an exemplary method for selecting a polarization configuration of transmitted signals.

FIG. 7 illustrates a block diagram of an exemplary method for selecting a polarization configuration of transmitted signals. In FIG. 7, steps 710-740 substantially correspond to steps 410-440, respectively, which are described above. Specifically, the first wireless communication device 201 transmits signals in either the first polarity or the second polarity (710, 730 respectively). When the signal quality of signal received in the currently-selected polarity falls below a predetermined threshold (720, 740 respectively), the second wireless communication device 202 initiates a polarization switch (730, 710 respectively).

In order to also account for the possibility of switching into a dynamic polarization configuration, the method of FIG. 4 can simply be modified with additional steps. In particular, as shown in FIG. 7, each time the receiver initiates a static polarization switch, it also increments a counter (750), and continues to monitor this counter relative to a timestamp.

In a first scenario, the timestamp reaches some time limit (e.g., a coherence limit) prior to the counter reaching some counter limit (e.g., switch limit) (760). This indicates that static polarization selections are sufficiently coherent to warrant remaining in static polarization configurations. In other words, the polarizations have not switched too many times over the last time interval (as measured by the coherence time limit). Therefore, the devices can continue to operate in static polarization configurations. Consequently, the counter and the timestamp are resent (770), and the procedure continues in static mode.

In a second scenario, the counter reaches the switch limit prior to the timestamp reaching the coherence limit (780). This indicates that static polarization selections have become insufficient for any of the reasons discussed above. In other words, the polarizations have been switched too many times over the last time interval (as measured by the coherence time limit). Therefore, the devices should switch to a dynamic polarization configuration (790).

Using this algorithm, the wireless communication devices can efficiently determine when it becomes necessary to switch from static polarization configurations to a dynamic polarization configuration. Further, although not illustrated, the second wireless communication device 202 can re-enter static mode by monitoring the channel responses and/or signal qualities of the differently-polarized signals, and determining that one polarization has become significantly stronger than the other or that the channel is no longer fluctuating as rapidly as before. In this manner, even further improvement or optimization can be achieved during communication between the first and second wireless communication devices.

Figure 8:
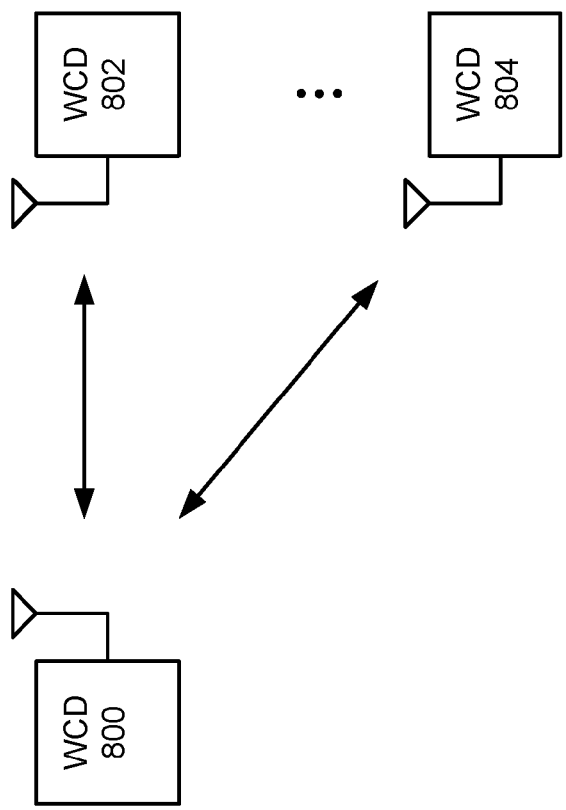
FIG. 8 illustrates a block diagram of an exemplary first wireless communication device and a plurality of exemplary second wireless communication devices that are implemented as part of the wireless communication environment.

FIG. 8 illustrates a block diagram of an exemplary first wireless communication device and a plurality of exemplary second wireless communication devices that are implemented as part of the wireless communication environment. In particular, while the embodiments discussed in conjunction with FIGS. 2-7 have focused on communications between a pair of wireless communication devices such as (110, 150) or (201, 202), the techniques described herein can be applied to other multi-user environments such as those described in conjunction with FIG. 1A. In particular, wireless communication device 800 can be a base station or access point, such as base station or access point 18, and can include the functionality of first wireless communication device 201. Wireless communication devices 802 and 804 can be any of the real-time and non-real-time devices 12, 14, 16, 20, 22 and 25 and further can include the functionality of second wireless communication device 202. Also, as previously discussed in conjunction with first wireless communication device 201 and second wireless communication device 202, the wireless communication devices 800, 802, and 804 can each include the functionality ascribed to both the first wireless communication device 201 and second wireless communication device 202 to implement bidirectional communication between these devices.

Referring back to the reference numerals introduced in conjunction with FIG. 2, wireless communication 800 includes a polarity setting module 220 configured to set a plurality of polarity modes for the wireless communication with a plurality of external devices (802, 804, . . . ). The plurality of polarity modes include selected ones of at least: a first polarity mode, and a second polarity mode. In operation, the polarity setting module 220 sets the plurality of polarity modes based on information received from each of the plurality of external devices (802, 804, . . . ) to facilitate the efficient communication, to dynamically adjust to channel conditions and/or to mitigate co-interference between these devices. As discussed in conjunction with the second wireless communication device 202, this information can be in the form of the data in TABLE 1, a signal quality measurement or indicator, or other data that reflects the channel conditions, throughput or other performance measure for each polarity mode.

The framing module 230 is configured to generate data for transmission to the plurality of external devices (802, 804, . . . ) via RF signaling in accordance with the plurality of polarity modes set by the polarity setting module 220 and implemented via baseband or RF control and/or via antenna selection.

Various use cases in this multiuser environment are presented in conjunction with FIGS. 9-13 that follow.

Figure 9:
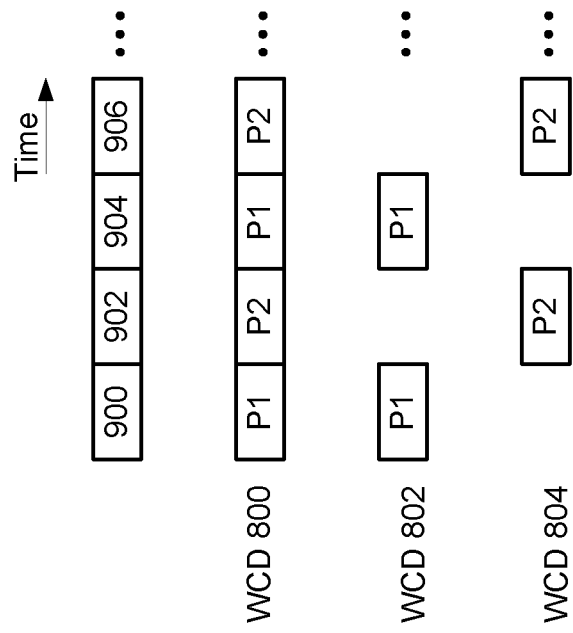
FIG. 9 illustrates a temporal diagram of wireless communications between an exemplary first wireless communication device and a plurality of exemplary second wireless communication devices as part of the wireless communication environment.

FIG. 9 illustrates a temporal diagram of wireless communications between an exemplary first wireless communication device and a plurality of exemplary second wireless communication devices as part of the wireless communication environment. In this embodiment, time division multiplexing is applied to separate communications between the wireless communication device 800 and the wireless communication devices 802 and 804 in a plurality of time slots 900, 902, 904, 906, etc.

In operation, a polarization P1 is determined for communication by wireless communication devices 800 and 802 as previously described. Further, a polarization P2 is separately determined for communication by wireless communication devices 800 and 804.

The polarities P1 and P2 can be the same polarity mode or different polarity modes depending on the channel conditions. The polarity setting module of wireless communication device 800 sets a P1 polarity for the wireless communications with wireless communication device 802 during a time slots 900, 904, etc. The polarity setting module of wireless communication device 800 sets a P2 polarity for the wireless communications with a wireless communication device during a time slots 902, 906, etc.

As previously discussed, once initial polarizations are set for each communication pair, the polarity setting module of wireless communication device 800 can dynamically adjust the polarities P1 and P2 for the wireless communication with each of the wireless communication devices 802 and 804. These polarity adjustments can be made in coordination with the corresponding device 802 or 804 based on feedback received from that device, but can be made independently from the other device. In this fashion, P1 and P2 can be set and can vary independently from one another.

FIG. 10 illustrates a temporal diagram of wireless communications between an exemplary first wireless communication device and a plurality of exemplary second wireless communication devices as part of the wireless communication environment. In this embodiment, time division multiplexing is applied to downstream communications between the wireless communication device 800 and the wireless communication devices 802, 804, 802' and 804' in a plurality of time slots 1000, 1002, 1004, 1006, etc. In this scenario downstream data is transmitted by wireless communication device 800 to wireless communication devices 802 and 804 during time slots 1000 and 1002, contemporaneously and at the same frequency via, for example, spatial orthogonality. Downstream data is transmitted by wireless communication device 800 to wireless communication devices 802' and 804' during time slots 1004 and 1006, contemporaneously and at the same frequency via, for example, spatial orthogonality.

In operation, the polarization setting module of each wireless communication device sets it polarity. For example, a polarization P1 is determined for downstream communication by wireless communication device 800 to communication devices 802 and 804 based on information received from these devices. Further, a different polarization P2 is determined for downstream communication by 800 to communication devices 802' and 804' based on information received from these other devices. In particular, wireless communication device 800 considers feedback data from each of the devices 802, 802', 804 and 804' to mitigate or otherwise reduce possible co-interference by grouping together possible interfering devices in different groups. In this fashion, when information received indicates possible co-interference between devices 802/802' or possible co-interference between devices 804/804' these devices can be assigned to different time slots and/or different polarizations.

Once the transmit polarities for wireless communication device 800 are set, each receiving device can set its own receive polarity to achieve the best reception. In the example shown, the wireless communication device 802 utilizes polarity P1 while the wireless communication device 804 utilizes polarity P2 for receiving the P1 downstream communications during time slots 1000 and 1002. Further, the wireless communication device 802' utilizes polarity P1 while the wireless communication device 804' utilizes polarity P2 for receiving the P2 downstream communications during time slots 1004 and 1006.

As previously discussed, once initial downstream polarizations are set for each communication group, the polarity setting module of wireless communication device 800 can dynamically adjust the polarities P1 and P2 for the wireless communication with each of the wireless communication devices 802, 802', 804 and 804'. These polarity adjustments can be made in coordination with the corresponding devices 802, 802', 804 and 804' based on feedback received from these devices. Further, the reception polarization can be dynamically adjusted independently by each receiver, based on channel conditions and based on the transmit polarization, to achieve the best results at each receiver.

FIG. 11 illustrates a temporal diagram of wireless communications between an exemplary first wireless communication device and a plurality of exemplary second wireless communication devices as part of the wireless communication environment. In this embodiment, time division multiplexing is applied to downstream communications between the wireless communication device 800 and the wireless communication devices 802, 804, 802' and 804' in a plurality of time slots 1100, 1102, 1104, 1106, etc. In this scenario upstream data is transmitted to wireless communication device 800 by wireless communication devices 802 and 804 during time slots 1100 and 1102, contemporaneously and at the same frequency via, for example, spatial orthogonality. Upstream data is transmitted to wireless communication device 800 by wireless communication devices 802' and 804' during time slots 1104 and 1106, contemporaneously and at the same frequency via, for example, spatial orthogonality.

In operation, the polarization setting module of each wireless communication devices sets it polarity. In one embodiment, wireless communication device 800 considers feedback data from each of the devices 802, 802', 804 and 804' to mitigate or otherwise reduce possible co-interference by grouping together possible interfering devices in different groups for the allocation of time slots. In this fashion, when information received indicates possible co-interference between devices 802/802' or possible co-interference between devices 804/804' these devices can be assigned to different time slots and/or different receive polarizations. Each transmitting device can set its own transmit polarity to achieve the best reception. In the example shown, the wireless communication device 802 utilizes polarity P1 while the wireless communication device 804 utilizes polarity P2 for upstream communications during time slots 1100 and 1102. Further, the wireless communication device 802' utilizes polarity P1 while the wireless communication device 804' utilizes polarity P2 for upstream communications during time slots 1104 and 1106.

In addition, a polarization P1 is determined by wireless communication device 800 for reception of upstream communication from communication devices 802 and 804 by based on information shared between devices. Further, a polarization P2 is determined by wireless communication device 800 for reception of upstream communication from communication devices 802' and 804' by based on information shared between these other devices.

As previously discussed, once initial upstream transmit and receive polarizations are set for each device, the polarity setting module of each wireless communication device can dynamically adjust the polarities as required to adapt to channel conditions, to achieve the best results.

FIG. 12 illustrates a flow diagram of a method used in conjunction the wireless communication environment. In particular, a method is presented for use in conjunction with one or more functions and features described in conjunction with FIGS. 1-11. Step 1200 includes receiving information from a plurality of external devices. Step 1202 includes setting a plurality of polarity modes for the wireless communication with the plurality of external devices, wherein the plurality of polarity modes include selected ones of at least: a first polarity mode, and a second polarity mode, and wherein the plurality of polarity modes are set based on the information received from the plurality of external devices. Step 1204 includes generating data for transmission to the plurality of external devices via RF signaling in accordance with the plurality of polarity modes.

In an embodiment step 1202 includes setting the first polarity mode for the wireless communications with a first of the plurality of external devices during a first time slot and setting the second polarity mode for the wireless communications with a second of the plurality of external devices during a second time slot. Step 1204 can include generating the data for transmission to at least two of the plurality of external devices contemporaneously and at the same frequency. Step 1202 can include setting the plurality of polarity modes for the transmission to the at least two of the plurality of external devices based on the information received from the plurality of external devices to reduce co-interference for the at least two of the plurality of external devices. The first polarity mode can be in accordance with a first transmission polarity and the second plurality mode can be in accordance with a second transmission polarity, wherein the first transmission polarity is orthogonal to the second transmission polarity.

FIG. 13 illustrates a flow diagram of a method used in conjunction the wireless communication environment. In particular, a method is presented for use in conjunction with one or more functions and features described in conjunction with FIGS. 1-11. Step 1300 includes dynamically adjusting the plurality of polarity modes for the wireless communication with the plurality of external devices based on the information received from the plurality of external devices.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Various embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

A physical embodiment of an apparatus, an article of manufacture, a machine, and/or of a process that includes one or more embodiments may include one or more of the aspects, features, concepts, examples, etc. described with herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of the various. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various options, methods, functions and features have been expressly described herein, other combinations of these options, methods, functions and features are likewise possible. The various embodiments are not limited by the particular examples disclosed herein and expressly incorporates these other combinations.

What is claimed is:

1. A wireless communication device capable of wireless communication with a plurality of external devices, the wireless communication device comprising:
a polarity setting module configured to set a plurality of antenna polarity modes for the wireless communication with the plurality of external devices via selected ones of a plurality of antenna polarizations, wherein the plurality of antenna polarity modes include selected ones of at least: a first polarity mode, and a second polarity mode, and wherein the polarity setting module sets the plurality of antenna polarity modes based on information received from the plurality of external devices; and
a framing module configured to generate data for transmission to the plurality of external devices via radio frequency (RF) signaling in accordance with the plurality of antenna polarity modes set by the polarity setting module, wherein at least one frame of the data includes a channel estimation field split into a first sub-field portion transmitted via the first polarity mode and a second sub-field portion transmitted via the second polarity mode;
wherein the polarity setting module switches between a first transmission antenna polarization of the plurality of antenna polarizations for transmission of the first sub-field portion via the first polarity mode and a second transmission antenna polarization of the plurality of antenna polarizations for transmission of the second sub-field portion via the second polarity mode.

2. The wireless communication device of claim 1 wherein the polarity setting module sets the first polarity mode for the wireless communications with a first of the plurality of external devices during a first time slot and sets the second polarity mode for the wireless communications with a second of the plurality of external devices during a second time slot.

3. The wireless communication device of claim 1 wherein the framing module generates data for transmission to at least two of the plurality of external devices contemporaneously and at the same frequency.

4. The wireless communication device of claim 3 wherein the polarity setting module sets the plurality of antenna polarity modes for the transmission to the at least two of the plurality of external devices based on the information received from the plurality of external devices to reduce co-interference for the at least two of the plurality of external devices.

5. The wireless communication device of claim 1 wherein the polarity setting module dynamically adjusts the plurality of antenna polarity modes for the wireless communication with the plurality of external devices based on the information received from the plurality of external devices.

6. The wireless communication device of claim 1 wherein the first transmission antenna polarization is orthogonal to the second transmission antenna polarization.

7. The wireless communication device of claim 1 wherein the wireless communication device is one of: a base station and an access point.

8. A wireless communication device capable of wireless communication with a plurality of external devices, the wireless communication device comprising:
a polarity setting module configured to set and dynamically adjust a plurality of antenna polarity modes for the wireless communication with the plurality of external devices via selected ones of a plurality of antenna polarizations, wherein the plurality of antenna polarity modes include selected ones of at least: a first polarity mode, and a second polarity mode, and wherein the polarity setting module sets and dynamically adjusts the plurality of antenna polarity modes based on information received from the plurality of external devices; and
a framing module configured to generate data for transmission to the plurality of external devices via radio frequency (RF) signaling in accordance with the plurality of antenna polarity modes set by the polarity setting module, wherein at least one frame of the data includes a channel estimation field split into a first sub-field portion transmitted via the first polarity mode and a second sub-field portion transmitted via the second polarity mode;
wherein the polarity setting module switches between a first transmission antenna polarization of the plurality of antenna polarizations for transmission of the first sub-field portion via the first polarity mode and a second transmission antenna polarization of the plurality of antenna polarizations for transmission of the second sub-field portion via the second polarity mode.

9. The wireless communication device of claim 8 wherein the polarity setting module sets the first polarity mode for the wireless communications with a first of the plurality of external devices during a first time slot and sets the second polarity mode for the wireless communications with a second of the plurality of external devices during a second time slot.

10. The wireless communication device of claim 9 wherein the first transmission antenna polarization is orthogonal to the second transmission antenna polarization.

11. The wireless communication device of claim 8 wherein the framing module generates data for transmission to at least two of the plurality of external devices contemporaneously and at the same frequency.

12. The wireless communication device of claim 11 wherein the polarity setting module sets the plurality of antenna polarity modes for the transmission to the at least two of the plurality of external devices based on the information received from the plurality of external devices to reduce co-interference for the at least two of the plurality of external devices.

13. The wireless communication device of claim 8 wherein the wireless communication device is one of: a base station and an access point.

14. A method for use in wireless communication device capable of wireless communication with a plurality of external devices, the method comprising:
receiving information from the plurality of external devices;
setting a plurality of antenna polarity modes for the wireless communication with the plurality of external devices via selected ones of a plurality of antenna polarizations, wherein the plurality of antenna polarity modes include selected ones of at least: a first polarity mode, and a second polarity mode, and wherein the plurality of antenna polarity modes are set based on the information received from the plurality of external devices; and
generating data for transmission to the plurality of external devices via radio frequency (RF) signaling in accordance with the plurality of antenna polarity modes, wherein at least one frame of the data includes a channel estimation field split into a first sub-field portion transmitted via the first polarity mode and a second sub-field portion transmitted via the second polarity mode;
wherein setting the plurality of antenna polarity modes includes switching between a first transmission antenna polarization of the plurality of antenna polarizations for transmission of the first sub-field portion via the first polarity mode and a second transmission antenna polarization of the plurality of antenna polarizations for transmission of the second sub-field portion via the second polarity mode.

15. The method of claim 14 wherein setting the plurality of polarity modes includes setting the first polarity mode for the wireless communications with a first of the plurality of external devices during a first time slot and setting the second polarity mode for the wireless communications with a second of the plurality of external devices during a second time slot.

16. The method of claim 14 wherein generating the data for transmission includes generating the data for transmission to at least two of the plurality of external devices contemporaneously and at the same frequency.

17. The method of claim 16 wherein setting the plurality of polarity modes includes setting the plurality of polarity modes for the transmission to the at least two of the plurality of external devices based on the information received from the plurality of external devices to reduce co-interference for the at least two of the plurality of external devices.

18. The method of claim 14 further comparing:
dynamically adjusting the plurality of antenna polarity modes for the wireless communication with the plurality of external devices based on the information received from the plurality of external devices.

19. The method of claim 14 wherein the first transmission antenna polarization is orthogonal to the second transmission antenna polarization.

20. The method of claim 14 wherein the wireless communication device is one of: a base station and an access point.

* * * * *